(12) United States Patent
Murakowski et al.

(10) Patent No.: US 7,157,296 B2
(45) Date of Patent: Jan. 2, 2007

(54) ETCHLESS FABRICATION OF PLANAR PHOTONIC CRYSTAL STRUCTURES IN HIGH REFRACTIVE INDEX MATERIAL

(75) Inventors: Janusz Murakowski, Newark, DE (US); David Pustai, Newark, DE (US); Dennis W. Prather, Landenberg, PA (US)

(73) Assignee: University of Delaware, Newark, DE (US)

( * ) Notice: Subject to any disclaimer, the term of this patent is extended or adjusted under 35 U.S.C. 154(b) by 125 days.

(21) Appl. No.: 10/707,854

(22) Filed: Jan. 16, 2004

(65) Prior Publication Data
US 2004/0214361 A1 Oct. 28, 2004

Related U.S. Application Data

(60) Provisional application No. 60/464,353, filed on Apr. 22, 2003.

(51) Int. Cl.
*H01L 21/00* (2006.01)
(52) U.S. Cl. .............................. 438/31; 438/29; 372/64
(58) Field of Classification Search .................. 438/31, 438/29; 372/64
See application file for complete search history.

(56) References Cited

U.S. PATENT DOCUMENTS
6,711,200 B1* 3/2004 Scherer et al. ................ 372/64

OTHER PUBLICATIONS
"Etchless Fabrication of Slab Photonic Crystals in Silicon", Janusz Murakowski et al.., CLEO Conference Paper, May 19-25, 2002, Long Beach, California.
"Etchless Fabrication of Phnotonic Crystals in Silicon", Janusz Murakowski, et al., American Vacuum Society, J. Vac. Sci. Technology Bulletin 20(5), Sep./Oct. 2002.

* cited by examiner

*Primary Examiner*—Fernando L. Toledo
(74) *Attorney, Agent, or Firm*—Connolly Bove Lodge & Hutz, LLP; Larry J. Hume

(57) ABSTRACT

A planar photonic bandgap structure includes a substrate and a suspended membrane with holes. A waveguiding film is applied directly on and registered with the membrane so as to avoid the holes. The film has an index of refraction which is higher than an index of refraction of the membrane to allow a waveguiding function to occur within the film. A method of forming a planar photonic bandgap structure includes applying first and second films on a substrate and exposing a pattern of a plurality of holes on the second film. The exposed pattern is developed using a solvent where the dissolution rate of the first film is greater than a dissolution rate of the second film. A waveguiding layer is applied onto a top surface of a suspended membrane such that the layer has an index of refraction greater than an index of refraction of the suspended membrane.

11 Claims, 12 Drawing Sheets

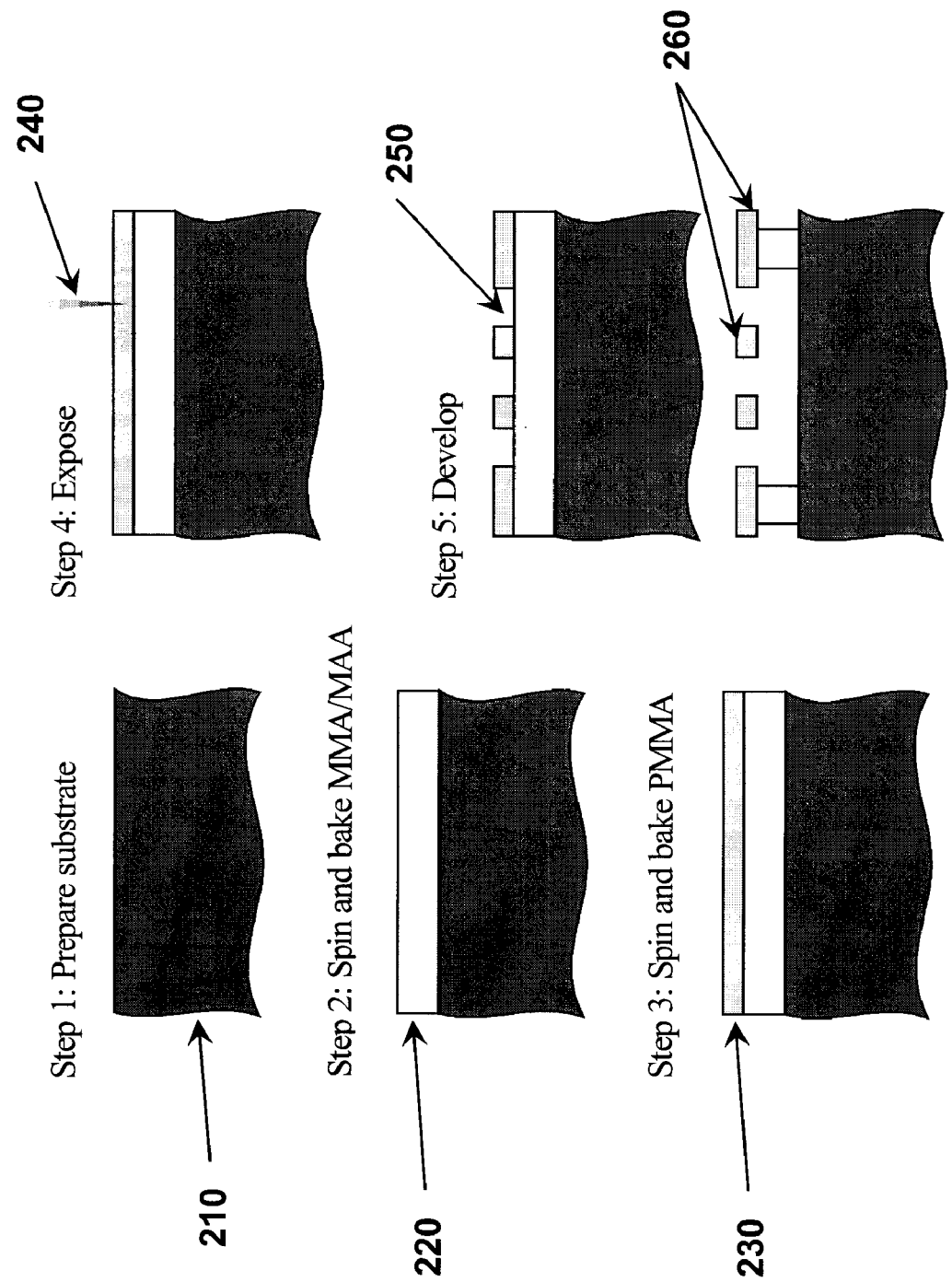

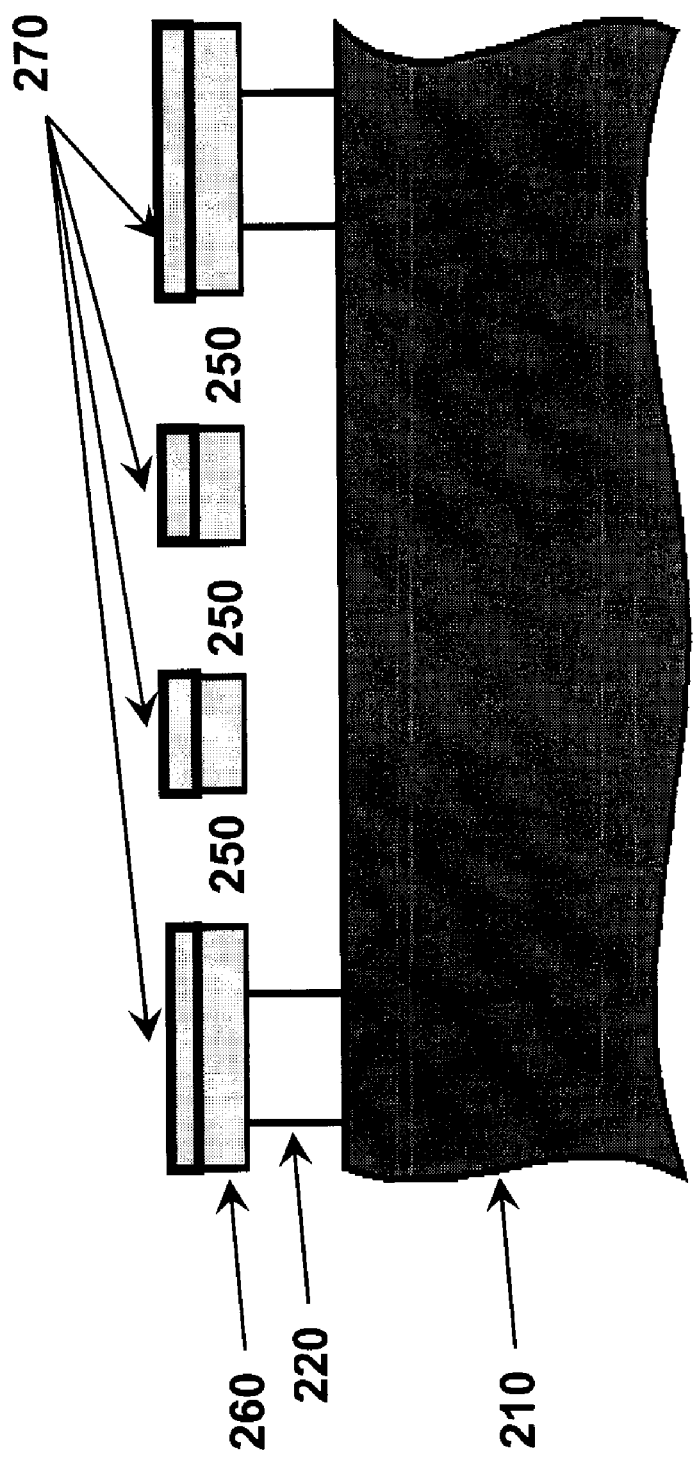

FIG. 5
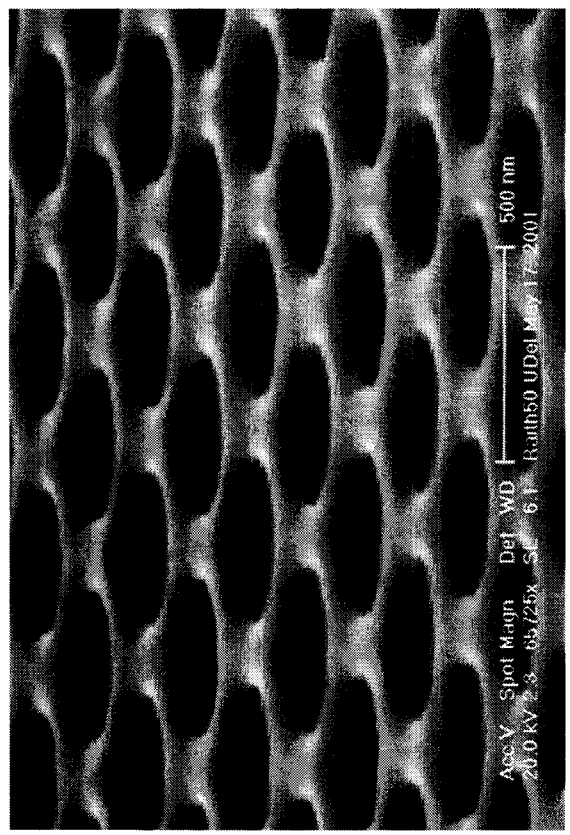
(B)
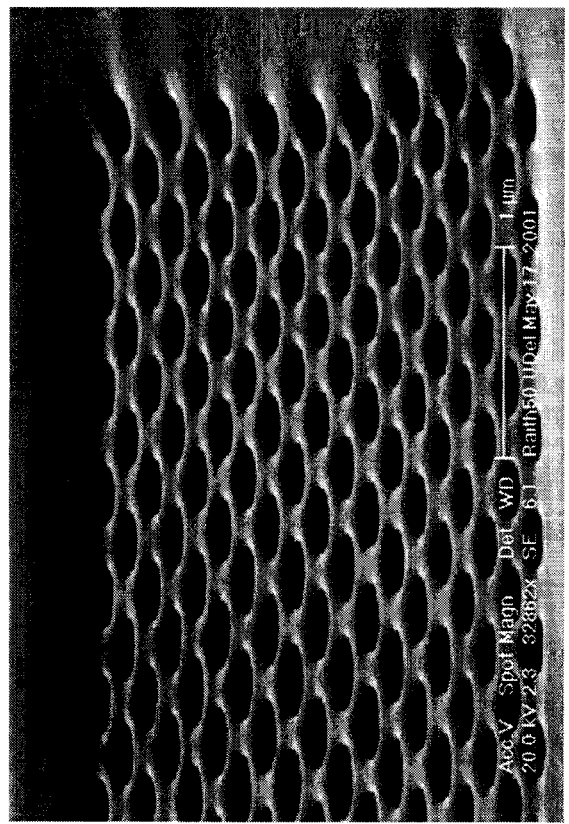
(A)

ETCHLESS FABRICATION OF PLANAR PHOTONIC CRYSTAL STRUCTURES IN HIGH REFRACTIVE INDEX MATERIAL

CROSS REFERENCE TO RELATED APPLICATIONS

This application claims the benefit under 35 U.S.C. § 119 (e) to co-pending Provisional Application Ser. No. 60/464,353 filed on Apr. 22, 2003 by Dennis W. Prather et al., the entire contents of which is incorporated herein by reference.

BACKGROUND OF THE INVENTION

This disclosure relates to photonic crystals and methods for fabricating photonic crystals and, in particular, is related in one aspect of the invention, to a photonic bandgap structure and method using a relatively high-index of refraction ("n") material having application in optical interconnection of semiconductor integrated circuits, for example. Related applications of this technology may be found in laser cavities, waveguides, high-Q micro cavities, Bragg reflector, super-prism self collimation, photonic crystal fiber, channel drop filter, optical interconnects, and hetero-structure beam splitters, for example.

A photonic crystal is a periodic arrangement of material structures, dielectric or metallic, of arbitrary shape, circles, squares, spheres, cubes, etc. This field has experienced tremendous growth, attributed to several factors, including increasing computational power available to researchers to study the interaction of light with structured matter, the wealth of phenomena discovered computationally and confirmed experimentally in both microwave and optical regimes, and development of fabrication methods capable of controlled structuring of material at scales commensurate with near infrared and visible wavelengths. Perhaps more importantly, the transition of the telecommunication industry to optical fibers for transporting voice and data, and the growing interest in developing low cost components for all-optical networks, has made the replacement of electrical wiring of an integrated circuit with optical structures technically feasible for more efficient photonic interconnection and on-chip communication.

The mechanism of operation of photonic crystals relies on the wave nature of light. Because light is a wave, when it encounters a periodic structure such that its period is comparable to the wavelength, coherent scattering will occur. Indeed, a similar situation is found in the study of solid state physics, where the wave function of an electron is modulated by the periodic potential of the crystalline lattice. This coherent scattering modifies the wave function of the electron which, in some cases, results in the opening of an electronic bandgap.

The presence of an electronic bandgap has profound consequences in electrical and thermodynamic properties of solids. Similarly, when periodicity is introduced in the dielectric constant "∈" (where $\epsilon = n2$, for non-magnetic materials) of a medium, a photonic bandgap can open. When this happens, electromagnetic waves of certain frequencies, e.g., those that fall within the bandgap, are forbidden to propagate through a medium having such a structure. This is the premise on which suppression of spontaneous emission has been achieved. Indeed, if light of a certain frequency, or equivalently, a photon of certain energy, is forbidden to propagate through the medium surrounding an atom, this atom will not be able to radiate photons of this energy. Thus, certain direct transitions between energy levels will be forbidden, and spontaneous emission will be suppressed.

For a complete photonic bandgap to exist, a fully three-dimensional periodic structure is required. From a practical perspective, it is useful to distinguish between two-dimensional (2D) and three-dimensional (3D) photonic crystals. A 3D photonic crystal consists of periodic arrangement of material structures such that the periodicity occurs in all three spatial dimensions. An example of 3D photonic crystal structure 100A is illustrated in FIG. 1A.

In contrast, in a 2D photonic crystal, the periodicity occurs only in two spatial dimensions. FIG. 1B shows an example of 2D photonic crystal 100B in the form of a perforated slab of dielectric. Clearly, in order to confine light in all dimensions, 2D photonic crystal 100B requires a different mechanism for the confinement of light in the third dimension. In the case of the structure presented in FIG. 1B, total internal reflection is often used.

While the lack of a full three-dimensional photonic bandgap in the case of 2D photonic crystal 100B is certainly a disadvantage of this configuration, the structure has important advantages over 3D photonic crystal 100A. First, the analysis of 3D photonic crystals requires full 3D simulations. Such simulations are computationally expensive, and thus allows for the analysis of only a limited number of geometries. On the other hand, even though a perforated slab is, in fact, a three-dimensional structure, 2D simulations often provide relatively good approximation of the interaction of light with the 2D structure. Furthermore, fabrication of 3D structures at scales required for a photonic bandgap to open at useful or desired optical wavelengths is difficult, given current technological constraints.

In further contrast, planar technologies developed for fabrication of semiconductor integrated circuits are well-suited for the fabrication of structures with features comparable to the wavelength of light, and thus provide a possible opportunity for structuring 2D photonic crystals.

Although methods based on semiconductor technology have been developed for fabrication of 2D photonic crystals, there is still room for improvement in terms of cost reduction, feasibility, and scalability to high volume production.

Thus, what is needed is a practical, less expensive fabrication method for producing 2D photonic crystal structures which is suitable for high-volume production, as compared to the traditional way of patterning planar photonic crystals in semiconductors.

BRIEF SUMMARY OF THE INVENTION

A method for fabricating planar photonic crystal structures for optical wavelengths preferably uses an etchless method which exploits different dissolution rates of polymers in the developer in order to create a perforated membrane suspended above a substrate in a single exposure/development step. Such a membrane is then used as a canvas for the deposition of a relatively high index dielectric material suitable for photonic applications. The use of a relatively high index of refraction material provides a higher contrast between the indices of refraction of the membrane material and the surrounding medium to improve both the width and stability of the resulting band gap.

In one embodiment, a method of forming a planar photonic bandgap structure includes providing a substrate; applying a first film on the substrate; applying a second film on the first film; exposing a pattern including a plurality of holes on the second film; developing the exposed pattern using a solvent, wherein a dissolution rate of the first film in the solvent is greater than a dissolution rate of the second film in the solvent, wherein a development time of the exposed pattern is selected to form a continuously suspended membrane from undissolved portions of the second film, said continuously suspended membrane being separated from the substrate by a void area; and applying a waveguiding layer onto a top surface of the continuously suspended membrane, said waveguiding layer having an index of refraction greater than an index of refraction of the continuously suspended membrane, wherein the plurality of holes are substantially free of any of the waveguiding layer.

In another embodiment, a planar photonic bandgap structure suitable for use as an optical element providing a waveguiding function includes a substrate; a membrane having a plurality of holes therein arranged so as to define the waveguiding function provided by the optical element, the membrane being suspended above the substrate by a copolymer supporting film between the substrate and the membrane around a peripheral region of the membrane; and a waveguiding film applied directly on and registered with the membrane so as to avoid the plurality of holes, wherein the waveguiding film has an index of refraction which is higher than an index of refraction of the membrane to allow the waveguiding function to occur in the waveguiding film.

Further scope and applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2A illustrates fabrication of an embodiment of a released photonic crystal structure in electron-beam sensitive resist; FIG. 2B illustrates an further processing step of applying an additional relatively higher refractive index film on the structure resulting from the process depicted in FIG. 2A;

FIG. 5A illustrates a perspective view of the released "holey" membrane, where the layer of PMMA where the holes are exposed is thinner than the deposited 200 nm due to proximity effect, which resulted in developing away some of the thickness; FIG. 5B is a magnified view of a portion of the membrane in FIG. 5A;

DETAILED DESCRIPTION

Figure 1:
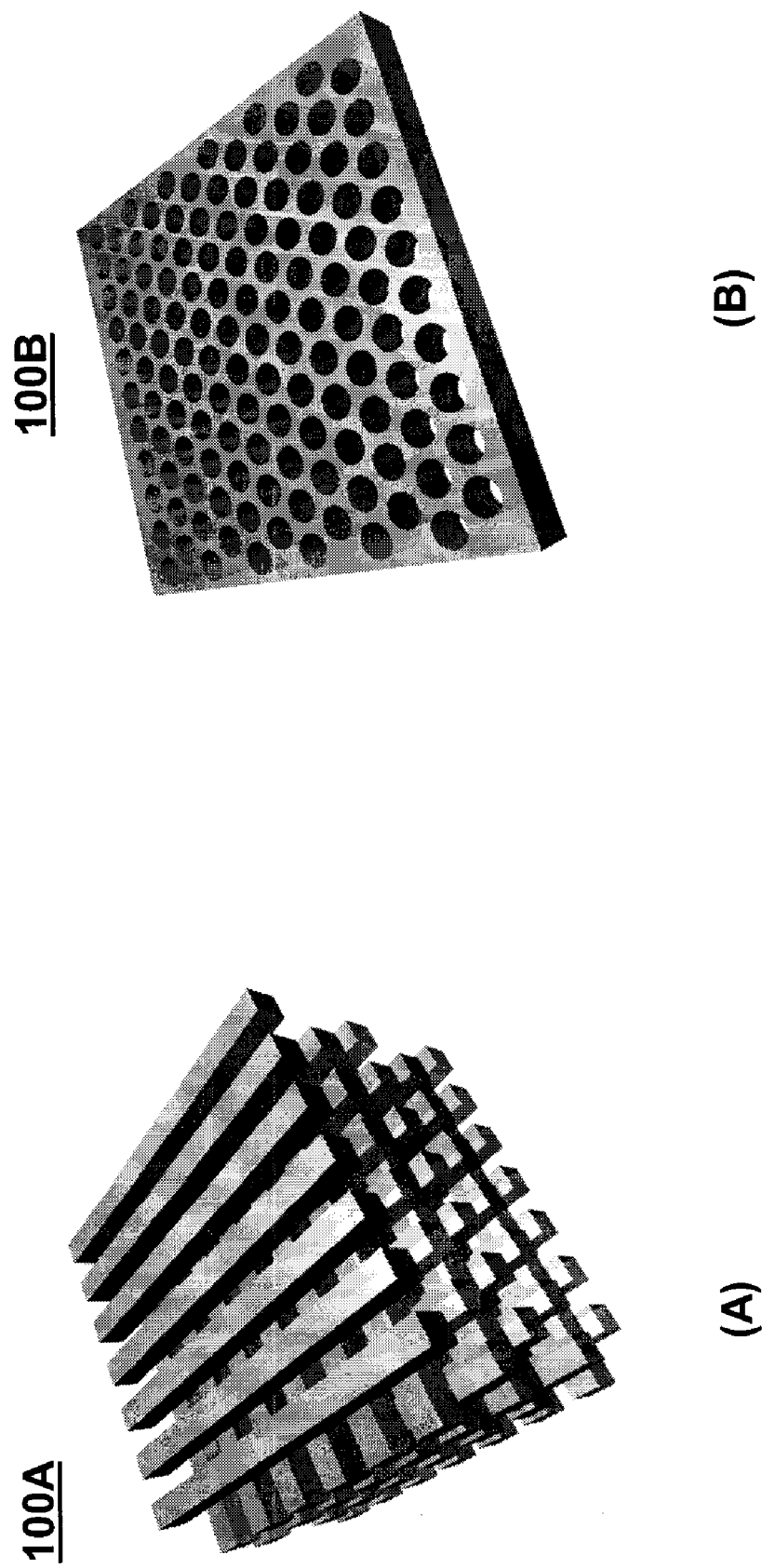
FIGS. 1A and 1B, respectively, provides a comparison of 3D and 2D photonic crystals, where the 3D crystal is a "woodpile structure", and the 2D crystal appears as a lattice of holes in a dielectric slab.

Fabrication of two-dimensional photonic crystals in the form of a slab waveguide with a patterned triangular lattice of holes in one embodiment of the invention is discussed below, with reference to the Drawings. The confinement of light in the plane of the slab is achieved by the virtue of a 2D photonic crystal lattice, whereas the confinement in the direction perpendicular to the slab relies upon total internal reflection.

In order for total internal reflection to take place, it is preferable that the slab be surrounded on both sides by a medium having a lower index of refraction n. The highest index contrast, and thus the optimum condition for guiding light in a tight volume, is achieved if the surrounding medium has the lowest index possible, that is, an index of refraction of n=1. This means that the slab preferably is suspended above the substrate, which provides structural support for the entire sample. A typical method used to fabricate a suspended slab, or a membrane, is based on furnishing a sacrificial layer of material that is removed after the structure on the top-most layer is patterned.

Steps involved in one embodiment of the fabrication process are depicted in FIG. 2A. In a first step, substrate 210, e.g., a silicon substrate, is provided and prepared for further processing. In a second step, sacrificial layer 220 is applied onto substrate 210 by, for example, spinning and baking. In one aspect of this embodiment, sacrificial layer 220 may comprise a methyl methacrylate/methacrylic acid (MMA/MAA) copolymer. Next, top layer 230 is applied onto MMA/MAA layer 220 by, for example, spinning and baking. In this aspect of the embodiment, top layer 230 is preferably an electron-beam ("e-beam") sensitive polymethyl methacrylate (PMMA) layer having molecular weight 950 K.

In the spinning processes, MMA/MAA 220 may be dissolved in ethyl lactate, whereas PMMA 230 may be dissolved in Anisole for the deposition of a thin film. Anisole is a relatively safer solvent than the traditionally used chlorobenzene. MMA/MAA 220 is preferably spun at 3000 rpm for 45 seconds, and then baked at 180 C. for approximately one minute to form a 900 nm thick film on a silicon substrate. Subsequently, PMMA 230 may be spun at 3000 rpm for 45 seconds, and then baked at 180 C. for approximately one minute to form a 200 nm thick film on top of MMA/MAA layer 220 previously deposited. The different thickness for PMMA 230 and MMA/MAA 220 results from different concentrations of these materials in the solvent.

In a fourth step, the sample may then be loaded to the chamber of a Raith50 e-beam lithography tool, and top PMMA layer 230 may be exposed and patterned by, for example, a focused e-beam 240 using a probe current of about 100 pA. In this embodiment, this amount of current allows both for forming a tightly focused spot, and for exposing relatively large areas in a reasonable time. An exemplary dose of approximately 230 µC/cm$^2$ was used.

In order to minimize the number of steps required to create a suspended membrane for a 2D photonic crystal structure, it is preferred to use the same chemical for developing top layer 230, where the photonic crystal is patterned, and for dissolving sacrificial layer 220. It should be noted in the steps above that no etching with harsh chemicals is involved.

The above approach contrasts with conventional fabrication process currently used for creating photonic crystals in semiconductors. For example, in silicon processes, after developing, the pattern is often transferred to the silicon layer by directional dry etching. In order to release the silicon slab from the underlying substrate, wet etching in hydrofluoric acid is conventionally required.

The patterns to be exposed in step 4 of FIG. 2A may be designed with, for example, a software tool provided with the Raith50 system (not shown), which works with a standard GDSII file format. Certain known extensions to this format allow for reduction of the file size and, at the same time, for better control of the exposure with e-beam. In particular, in order to expose approximately 400 nm holes in PMMA layer 230, single dot exposure has successfully been used. By varying the dose of the single dot exposure, variation in hole size has been achieved.

Figure 3:
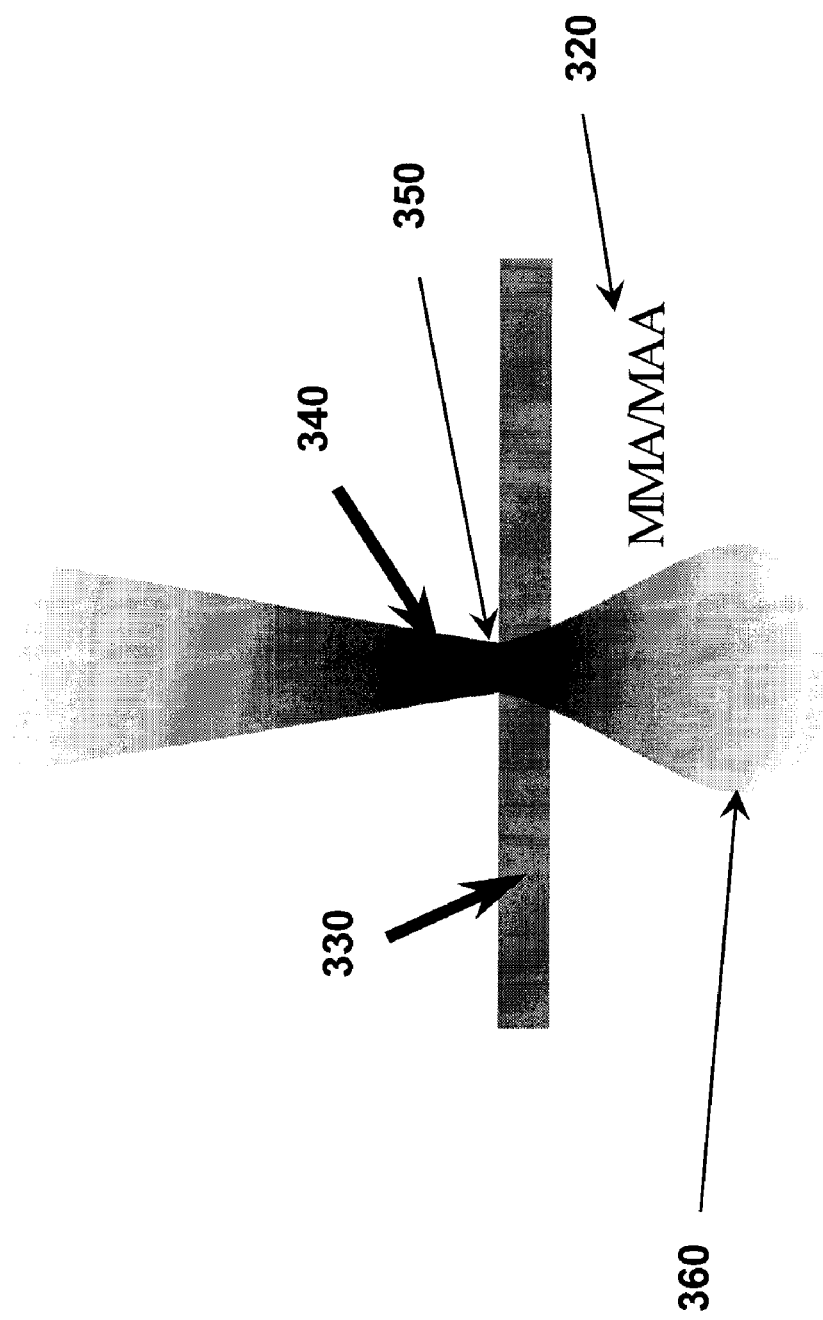
FIG. 3 depicts a scattering mechanism of electrons inside material.

The electrons in e-beam 240 are able to penetrate 200 nm thick PMMA film 230 relatively easily to expose MMA/MAA layer 220 underneath. Moreover, as soon as electrons enter MMA/MAA layer 220, the electrons scatter, due to the "proximity effect", as illustrated in FIG. 3. Thus, exposed region 360 is a space which is significantly larger than original spot size 350. Indeed, spot size 350 of focused electron beam 340 is on the order of 0.5–3 nm, which is demonstrated by the resolution of commercially available scanning electron microscopes (SEM). However, exposed features 360 are typically at least an order of magnitude larger than original spot size 350, due to scattering of electrons 340 inside MMA/MAA layer 320, as well as backscattering from the substrate.

Ordinarily, such scattering might be considered to be a drawback, since it limits the minimum feature size of a of a patterned structure. In the present case, such scattering due to the proximity effect is advantageous, since it allows e-beam 340 to expose a larger region 360 underneath a small exposed area 350.

Additionally, e-beam resists, such as PMMA or MMA/MAA, are generally more sensitive to less energetic electrons. Since scattering slows the electrons down, the volume deeper under the surface actually receives an effectively higher dose than the volume close to the surface. These effects contribute to the creation of undercut, or, in the case of a dense array of holes, of a membrane released from the substrate.

In a fifth step depicted in FIG. 2A, development of the exposed and patterned layers 220 and 230 is accomplished by applying a developer which, in one aspect of this embodiment, is a 1:3 solution of methyl isobutyl ketone (MIBK) in isopropyl alcohol. One effect in this embodiment is the higher dissolution rate in the developer of MMA/MAA 220, relative to PMMA 230. As soon as holes 250 open in PMMA layer 230 and create access to the layer 220 underneath, MMA/MAA 220 starts dissolving away, leaving suspended membrane structure 260. In one experiment, 30 seconds of development time proved sufficient to dissolve the thickness of 900 nm MMA/MAA layer 220 through holes 250 of approximately 200 nanometer diameter.

Experimental results of modifications of the type of processing described above are illustrated in FIGS. 4–7. In order to obtain a variety of hole sizes, an array of photonic crystal lattices was exposed with varying doses per point, in a single point exposure scheme.

Figure 4:
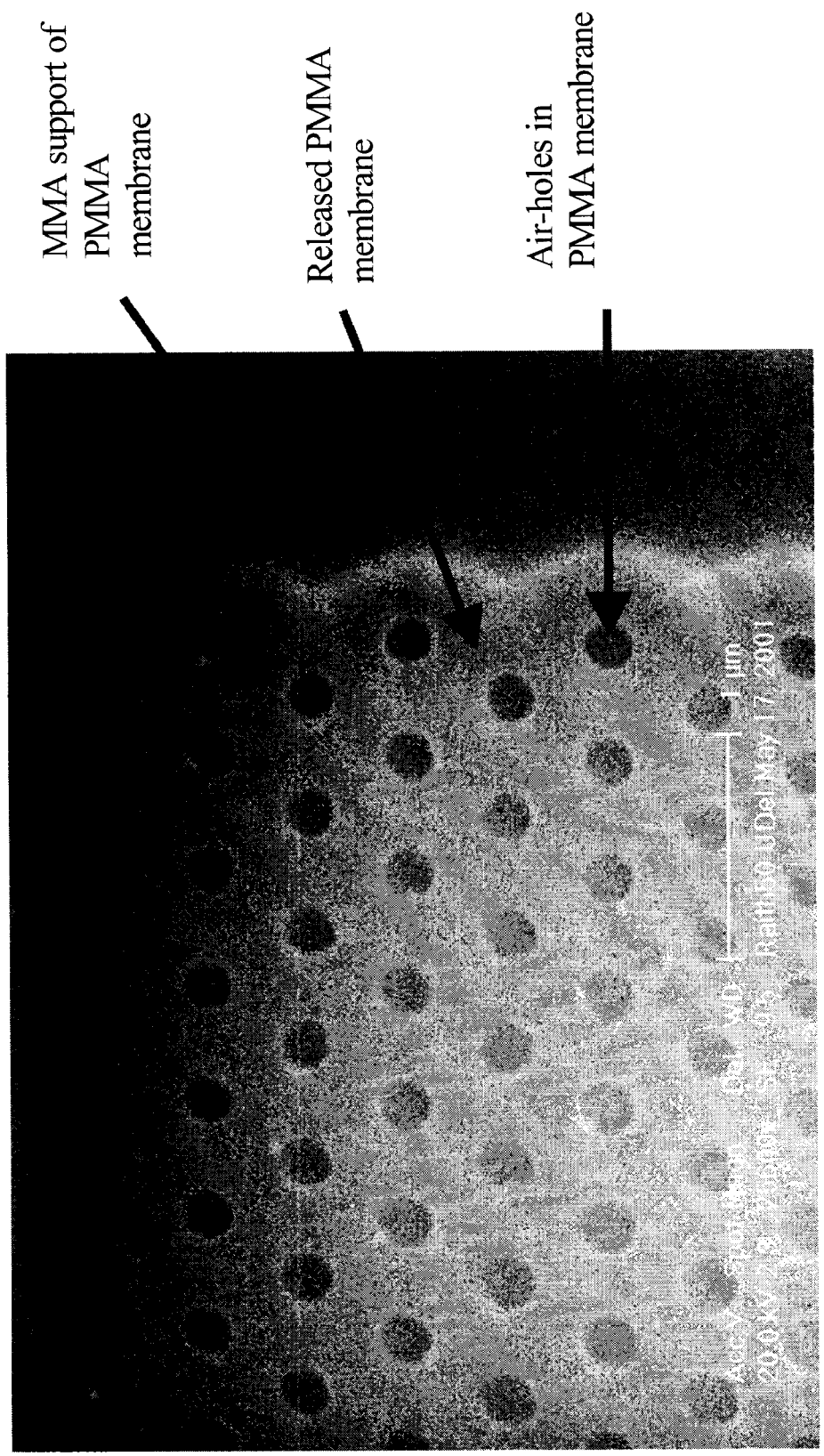
FIG. 4 shows a top-down view of a PMMA membrane, with the lattice of holes as well as the edge of the supporting MMA/MAA layer being visible.

FIG. 4 illustrates a top-down view of the patterned and developed photonic crystal. The image was obtained using the Raith50 system used for patterning, which doubles as a scanning electron microscope (SEM). The boundary between the released and the unreleased area can be seen as a contrast between the brighter released area, and the darker unreleased area. The triangular lattice of holes patterned in the suspended membrane is clearly visible. In this aspect of the invention, the holes have a diameter of less than 200 nm, at a pitch of 500 nm. However, it appears that any MMA/MAA underneath is cleared away completely in the region where the holes are patterned. The cleared region of MMA/MAA is seen to extend about 200 nm from the edge of the holes, due to the proximity effect as described above. While the top-down view of FIG. 4 is sufficient to illustrate the success of the proposed approach, it provides no clue as to the thickness of the membrane or whether it is truly released from the substrate.

FIGS. 5A and 5B illustrate a perspective view of the patterned and developed photonic crystal, where FIG. 5B is a magnified portion of the crystal shown in FIG. 5A. This view is useful for determining the thickness of the membrane.

In order to obtain a view which clearly shows the three-dimensional nature of the obtained structure for analysis purposes, a sample was mounted on a tilted platform for imaging under an SEM. To minimize charging of the non-conductive polymers during imaging, a thin film of gold of approximately 5 nm was deposited using an electron beam evaporator. The highly directional nature of the evaporation process gave rise to shadowing effect. Thus, the shadow of the perforated membrane apparent in FIG. 6B is a pattern of gold evaporated on the substrate. This allowed much clearer images of the structure to be obtained, due to better focusing at a higher accelerating voltage compatible for use with conductive samples, without a significant modification of the structure itself. The images of the tilted sample are presented in FIG. 6A and 6B.

FIG. 6B shows clearly that the membrane is raised above the surface. The separation distance of the membrane from the substrate is particularly significant in view of FIG. 6A, which shows that the membrane is lower than the unexposed region around it. Also, it appears that the thickness of the membrane is significantly smaller than the thickness of the deposited PMMA layer.

Whereas about 200 nm of PMMA has been spun, FIGS. 5A and 5B show that less than approximately 100 nm is left in the veins between the holes. This result is not surprising, since it is difficult to expect that, after developing, which is a wet chemical process, high aspect ratio features will be left in the PMMA. Thus, since the width of the area between the holes is less than 100 nm, the thickness of the material left there can be expected to be of the same order of magnitude.

In order to verify how far above the surface the membrane is raised, we used an overexposed element of the test grid pattern. An SEM micrograph of that element is presented in FIGS. 6A–6B. It is clear from these figures that the membrane is raised above the substrate surface. The separation of the membrane from the sample surface can be estimated from this picture by measuring the distance between the structure and the shadow it casts, and then using the angle of tilt of the sample with respect to the horizontal. Given that the angle in this analytical example is about 70 degrees, the separation from the surface is determined to be about 600 to 700 nm, which is somewhat less than the thickness of the deposited MMA/MAA.

However, FIG. 6A suggests that it is not the entire MMA/MAA layer that is thinner, but rather that the membrane sags in the middle. The reason for the sagging of the membrane is not immediately obvious. Gravity cannot be responsible for the phenomenon, since it has a small effect at these scales. One possibility is that the membrane was pushed in during the deposition of the gold layer used for improved analysis purposes, since gold atoms have a fairly high energy. However, a more likely cause is the surface tension of the developer and/or the rinse used in processing, e.g., steps 5 and 6 in FIG. 2A. After the development, when the sample is dried, the diminishing amount of liquid under the patterned PMMA layer pulls the PMMA layer toward the substrate by surface tension, which acts to deform the flexible membrane.

Figure 6:
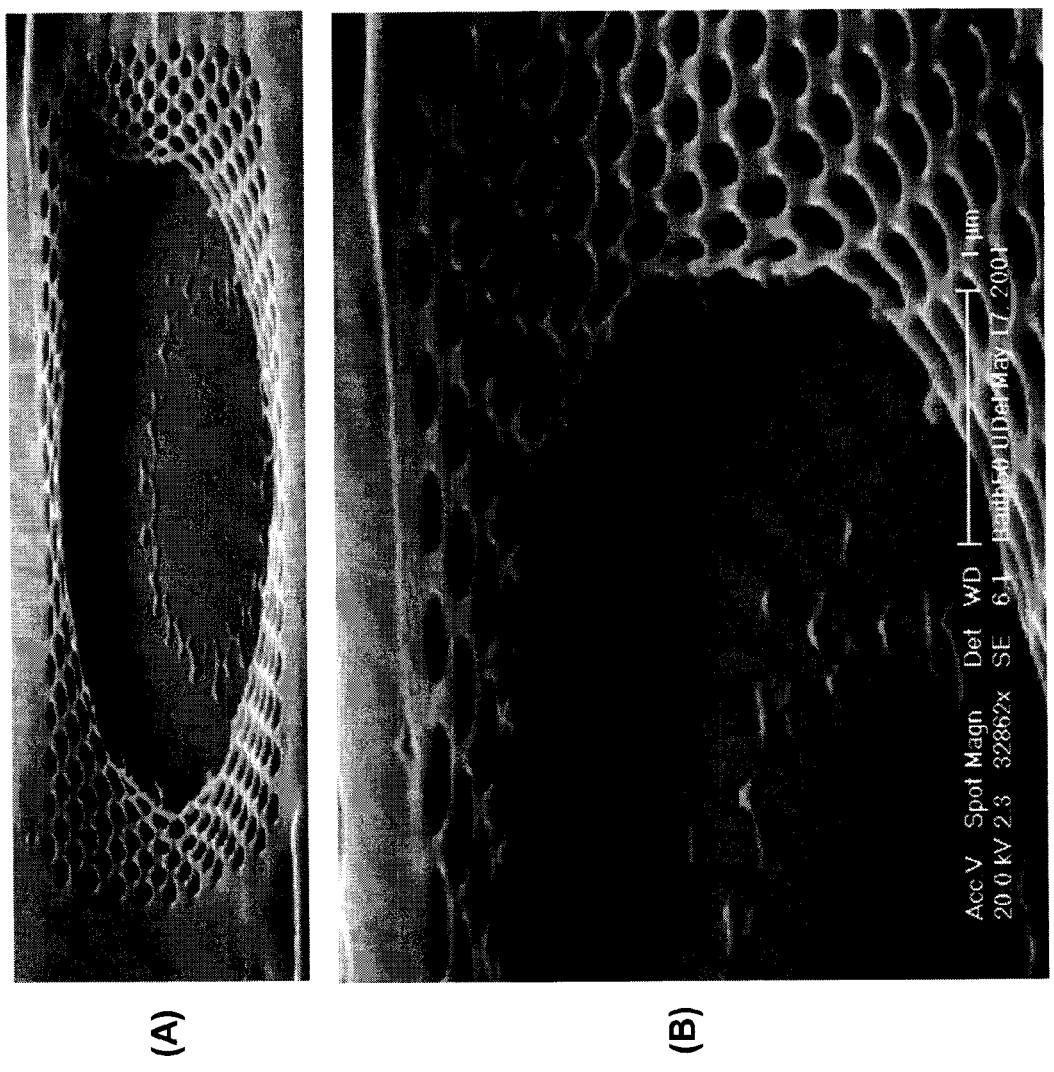
FIG. 6A illustrates an overexposed holey membrane, where the patterned membrane structure raised above the substrate is clearly visible.
FIG. 6B is a magnified view of a portion of the membrane in FIG. 6A.

FIGS. 4–6 conclusively show that we have successfully fabricated a membrane suspended above the substrate, as at least initially required for the creation of a 2D photonic crystal slab. Next, we demonstrated that various structures and defects can be incorporated in that structure, e.g., coupled waveguides. Coupled waveguides find application as add/drop lines, and show promise for extremely high selectivity filters, as required in wave division multiplexing, used in optical communication systems, for example.

Figure 7:
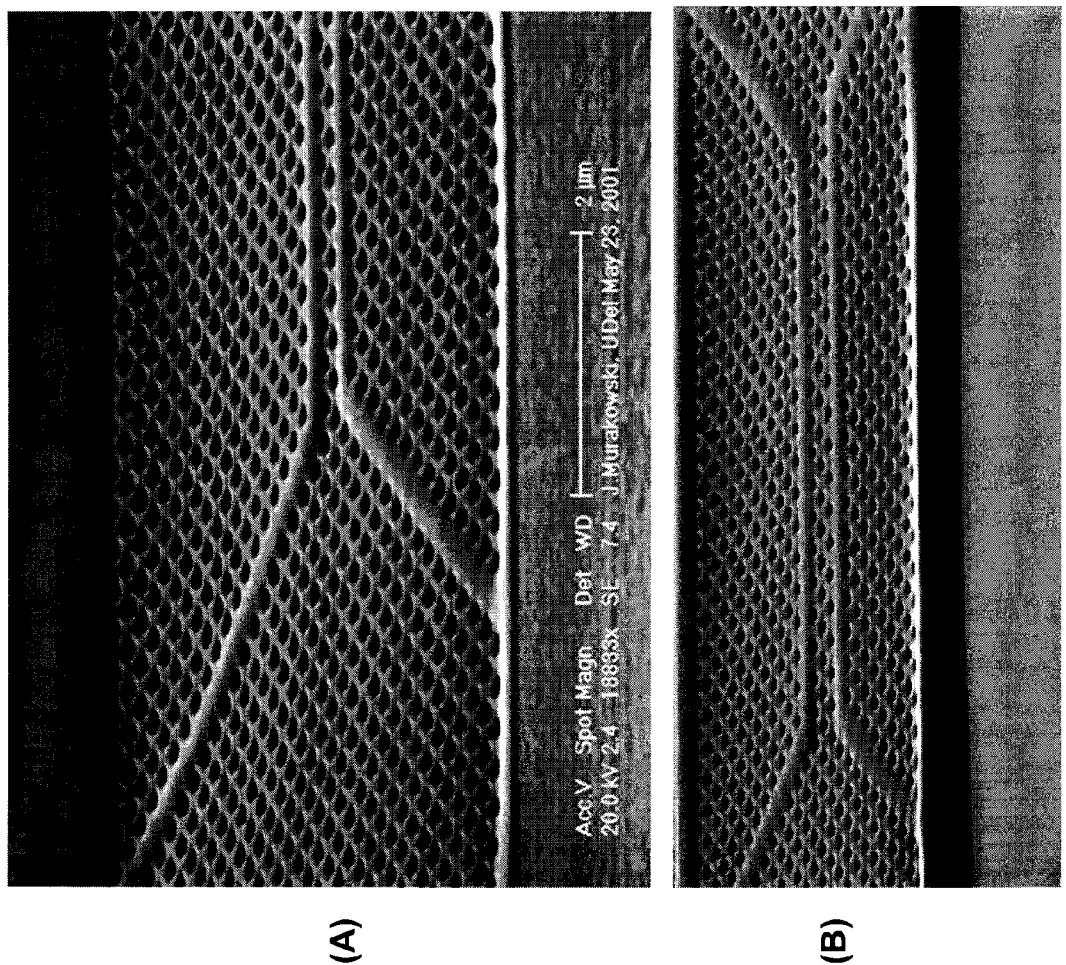
FIGS. 7A and 7B illustrate examples of waveguides patterned in a photonic crystal slab showing a lattice of airholes and waveguides and, in FIG. 7B the membrane is seen to be suspended above the substrate.
FIG. 7C shows a suspended PMMA membrane with a layer of silicon sputtered to increase refractive index contrast.
Figure 7C:
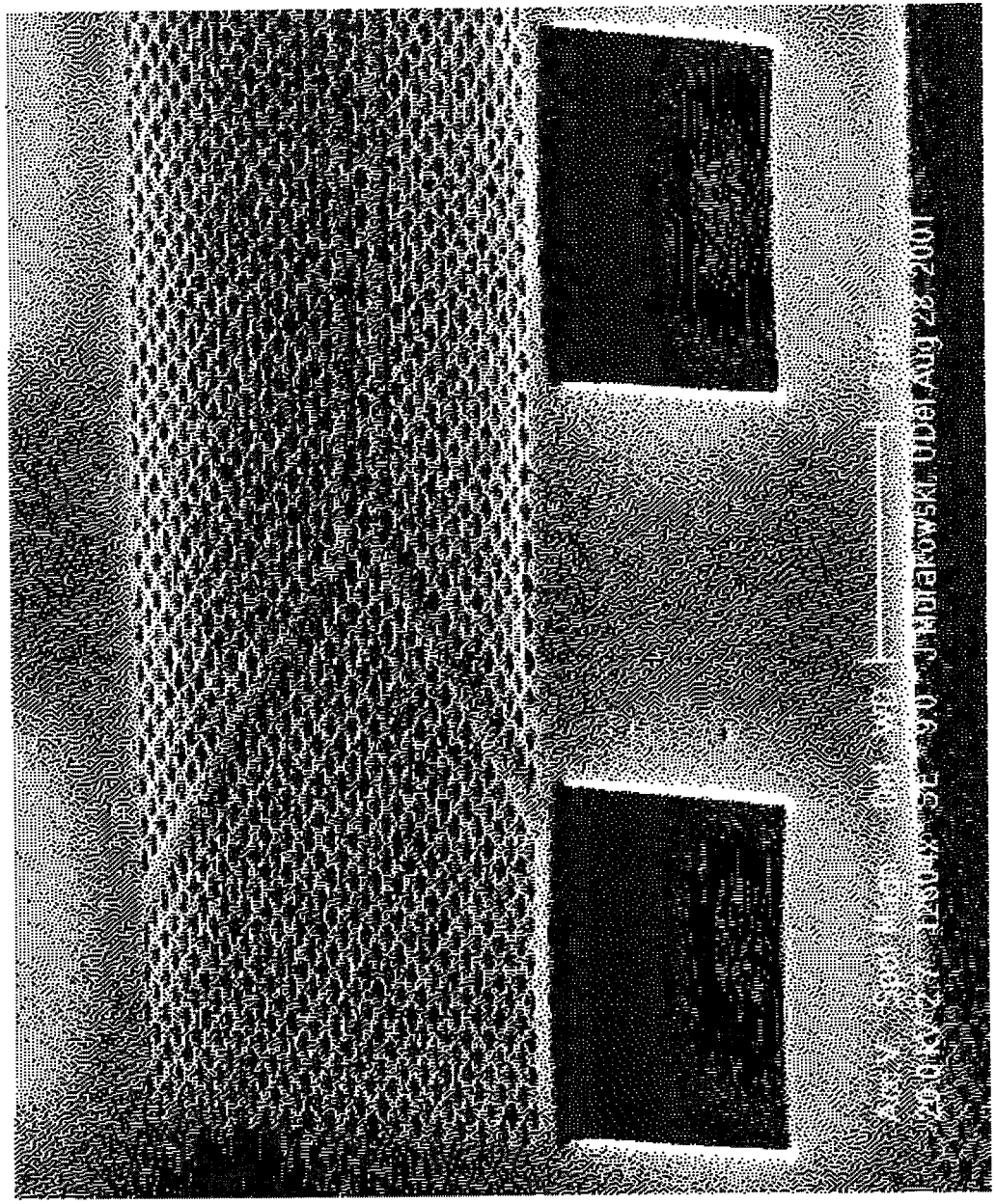

Exemplary fabricated devices are shown in FIGS. 7A, 7B, and 7C. Waveguides may be obtained by removing a row of holes from the otherwise regular lattice. Note that, in FIG. 7B, the membrane is still suspended above the substrate, which proves that the absence of holes in a single row is inconsequential for its release from the underlying substrate.

The refractive index of the PMMA layer used above is relatively low, i.e., $n \approx 1.5$. Therefore, the contrast between the refractive index of the PMMA and the surrounding medium, e.g., air with n=1, is relatively low. Consequently, as illustrated in the screen shot of FIG. 8, the photonic band gap that opens up when an array of circular holes is patterned is shown to be relatively narrow. Indeed, the normal variation in size that could be encountered in any manufacturing process might result in the disappearance of the photonic bandgap as a result of typical manufacturing variations. The screen shot of FIG. 8 was obtained from a commercially available software tool, "EMPLab", used to simulate electromagnetic wave behavior in various materials.

Figure 8:
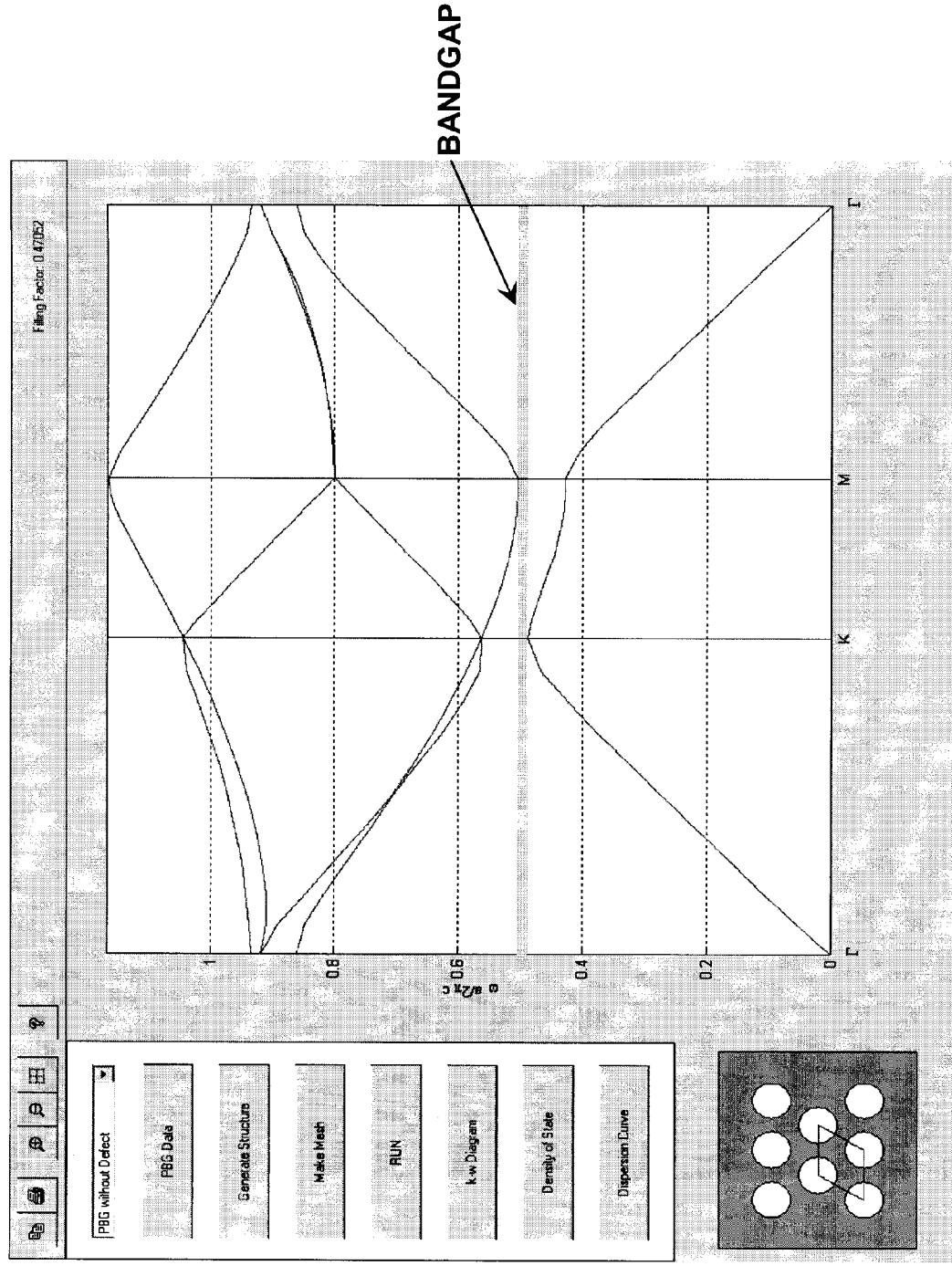
FIG. 8 provides a screen shot of a commercially-available software program, EMPLab, which analyses and illustrates a 2D band diagram of a triangular lattice of air holes in PMMA representative of the device in FIG. 2A, where the shaded stripe indicates the band gap.

In particular, FIG. 8 was obtained using a PBG Unit Cell Analysis tool which employs a Plane Wave Expansion method. The PBG Unit Analysis tool allows the end-user to map dispersion diagrams and surfaces for a variety of photonic crystal lattice configurations, including the calculated dispersion diagram for the photonic crystal whose parameters were input into the software program.

Fortunately, in transitioning from e-beam lithography to photolithography, a wide array of photoresists are available, and many of them have a significantly higher index of refraction than the PMMA used in the embodiment described above. For example, further increase in the refractive index contrast (i.e., the ratio of refractive indices of two adjacent materials) may be accomplished by adding nanocrystals of a relatively higher refractive index material, for example, ZnSe, to the polymer used for the membrane.

Alternatively, in a further preferred embodiment of the invention depicted in FIG. 2B, deposition of a material with a relatively higher index of refraction onto the suspended PMMA membrane having is carried out. Because of the higher index contrast obtained by use of the additional coating or waveguiding layer, improved stability and width of the photonic bandgap is achieved in the photonic bandgap structure resulting from the above-described processing of the first embodiment.

In order to utilize the type of perforated suspended membrane disclosed above in applications relating to guiding infrared radiation, for example, a relatively high-refractive index guiding film 270 may be deposited on top of the suspended membrane, as depicted in FIG. 2B. In one aspect of this embodiment, DC sputtering may be employed for depositing a thin film of silicon on the PMMA membrane. Silicon may be used due to its relatively high index of refraction, e.g., $n \approx 3.4$, thus allowing for opening a wide photonic band gap for near infrared wavelengths. In turn, this improves operational characteristics of the photonic band gap structure relative to the pure PMMA membrane described in the first embodiment.

Alternatively, other materials having a relatively high index of refraction or dielectric constant may be used, e.g., germanium or other known compatible materials. Electromagnetic waves may then be transmitted through the waveguiding or top layer/film, i.e., laterally or horizontally with respect to the substrate, in accordance with the functionality defined by presence and/or spacing of holes in the suspended PMMA membrane.

In this aspect of the invention, silicon was sputtered for 5 min at 200 W of DC power. Additionally, the stage was cooled to 23° C. to ensure that the PMMA did not disintegrate or deform during the process, and the sample was continuously rotated for uniform sputtering deposition. The sputtering system (not shown) preferably contains a confocal cathode arrangement in which the cathode is focused on a central area of the substrate table. Table rotation during sputtering provided even substrate exposure to the cathode, and resulted in excellent coating uniformity to within 5%. FIG. 7C illustrates a completed device which includes a sputtered silicon top layer.

Figure 9:
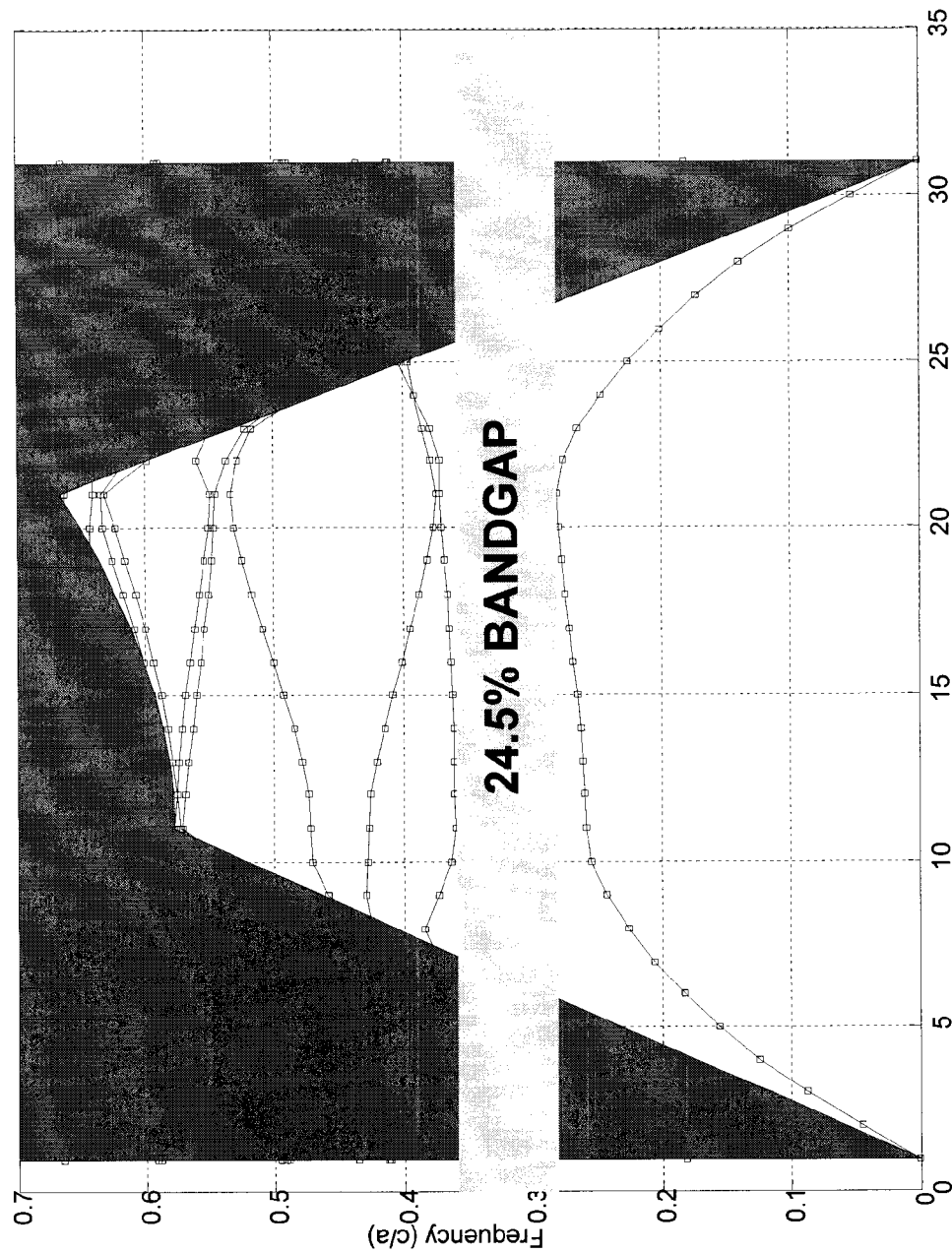
FIG. 9 provides a screen shot from EMPLab which illustrates a band diagram of a triangular lattice of air holes in PMMA representative of the device in FIG. 2B which has the relatively higher index of refraction film material on the membrane, where the shaded stripe indicates the improved band gap.

Using EMPLab simulation, the band gap with the additional coating of silicon on the suspended membrane has improved to almost 25% of the center frequency, as depicted in FIG. 9.

After sputtering, the structures take on a more solid look as shown in FIG. 7C. In addition to demonstrating the feasibility of creating a photonic crystal array in silicon, FIGS. 7A and 7B show structures that can be incorporated in order to produce functional devices. In this case, we have patterned two line defects in the form of coupled waveguides. This type of structure can be used, for example, in a beam splitter configuration, switch, or highly selective add/drop filters for wavelength division multiplexing. Interestingly, no sagging is observed in the membrane shown in FIG. 7A or 7B.

We have discovered that the less than 200 nm thick PMMA membrane can withstand deposition of silicon in the sputtering process. In effect, the PMMA membrane acts as a canvas, on which higher dielectric constant materials can be "painted" as desired. The visible roughness of the resulting surface can be alleviated by slowing down the deposition, or by using other deposition techniques. However, it appears that the roughness will have little, if any, effect on the propagation of light in the photonic crystal waveguides, since the defects are smaller than the wavelength for which the device has been designed.

The embodiments of the invention described above should be contrasted with conventional methods used to create planar photonic crystals, for example, methods to create a suspended silicon membrane using a combination of dry and wet etching techniques. In these conventional methods, dry etching is used to transfer the pattern created in PMMA using e-beam lithography to the silicon layer of an SOI wafer, for example. Subsequently, wet etching in a buffered oxide etch, or hydrofluoric acid, which attacks silicon dioxide, but not crystalline silicon, is used to release the membrane.

In the various aspects of the embodiments of the invention described above, no harsh chemicals or dry etching are involved. This makes our method safer, less expensive, and more environmentally sound. In particular, in one aspect of the invention, since we start with a low cost, widely available plain silicon wafer as opposed to expensive SOI wafers, the expense may be further reduced.

The novel and non-obvious embodiments of the invention discussed above represent a bottom up approach, where new structures are built on top of existing patterns. This is in contrast to top down approaches exemplified by etching. It should be clear that the method can be used to deposit a variety of materials other than silicon, as required for the particular application of the device. One difference would be the use of a different sputtering target.

This is another advantage of the disclosed method over etching, which often requires a change in the entire etch chemistry whenever a different material is used. Although sputtering was used as a method for depositing the material, other methods may be viable. In particular chemical vapor deposition (CVD) may be used, with appropriate adjustments in the properties of selected materials.

Figure 10:
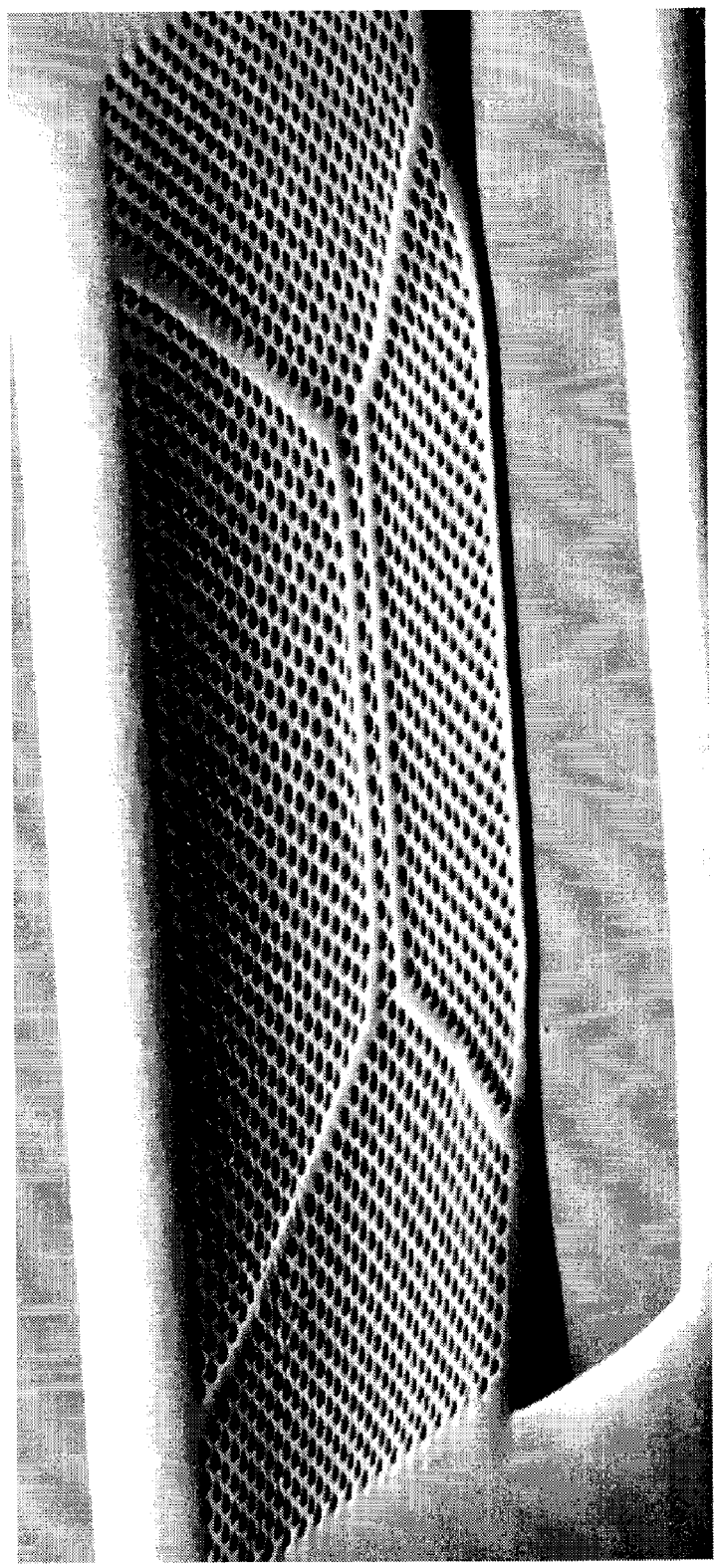
FIG. 10 illustrates an undesirable case of membrane sagging, where the membrane is supported on only three sides, and is pulled down all the way to the substrate.

One difficulty is associated with structural stability of the fabricated membranes. Since PMMA is flexible, a membrane made of this material has a tendency do deform under stress. The membrane may be stressed during processing when the developer evaporates and pulls the membrane to the substrate by surface tension. This effect may be most pronounced when the membrane is supported on only three of the four sides. As illustrated in the extreme case of FIG. 10, the membrane may be pulled all the way to the substrate, which destroys the vertical index confinement.

Several approaches may be used to alleviate this problem. For example, the structure may be designed to minimize the span of the membrane and, at the same time, to ensure that it is always supported on all sides. While this technique does not require any further material investigations, it limits the applicability of the method to devices that can be selected in such a way as to comply with this constraint. Second, the developer and/or rinse could be chosen such that the surface tension is minimized during the evaporation of the liquid. Finally, the resist could be treated or engineered so as to promote rigidity of the structure.

The sagging effect can also be alleviated by using a so-called "critical point drying" (CPD) technique, which eliminates the surface, and thus the surface tension, of the developing/rinsing fluid in the final step of drying the sample. Critical point drying is a method widely used in the preparation of biological specimens for e-beam lithography, in order to avoid the distortion of the tissue as it is dried, before placement in a vacuum chamber. Also, CPD is used in micro-electromechanical (MEM) system applications, in the final release of membranes and cantilevers.

CPD will free the device design from the constraint of relatively small areas and firm support on all sides of the structure. Thus, we provide a complete method of fabricating photonic crystal devices in a variety of high index materials. The advantages of the proposed bottom up approach, as compared to traditional top down methods based on etching, lie in the reduced number of steps required for fabrication, low cost of substrate and chemicals, and flexibility in the use of materials for the guiding layer. Furthermore, additional layers can be easily deposited for cladding and passivation purposes.

The size of the fabricated structures can be varied as desired for the considered applications. We have successfully fabricated lattices with a period of 500 nm, which is of particular interest to the telecommunication industry, as well as 300 nm, which results in the scaling of the band gap wavelengths by a factor of 0.6 as compared to the 500 nm structures. Although we have discussed the use of e-beam lithography to pattern the desired structures, this has been the method of choice rather than a necessary constraint. Indeed, with the resolution of optical lithography currently well below 200 nm, the structures required for applications in the near infrared and visible regimes can be readily patterned and mass produced using standard tools available in the semiconductor industry. As a result, low cost photonic devices can be manufactured using existing infrastructure.

Full 3D numerical simulations indicate that a 200 nm silicon slab perforated with holes of diameter 300 nm arranged in a triangular lattice (i.e., "triangular" meaning three adjacent holes form the vertices of an equilateral triangle) with a lattice constant of 500 nm, exhibits a photonic band gap between $\lambda=1.39$ μm and $\lambda=1.77$ μm, which is about 24% of the center frequency. The 1.55 μm wavelength, which is of particular interest to the telecommunication industry (i.e., near-IR fiber optic communication), is about in the middle of the band gap. Even if the hole size is significantly reduced to 200 nm, the band gap persists, but its width falls to 8% of the center frequency.

The approach to creating 2D photonic crystals in organic materials described above is based upon different dissolution rates of exposed resists in a chemical developer. This allows for the release of the photonic crystal structure patterned in low dissolution rate material from the substrate, if it is deposited on top of a high dissolution rate material. We have demonstrated in one embodiment that an opening in the top layer of less than 200 nm allows for removing at least 900 nm thick layer underneath. Lateral undercut creates a released membrane if an array of holes is patterned. While the technique has been described in terms of using electron beam lithography, there is no reason to be limited to this way of patterning the desired structures.

Further, although the substrate has been described in terms of silicon, other types of materials could be used as a substrate, as long as the material chosen provides adequate mechanical support for the suspended membrane. For example, although a silicon-on-insulator (SOI) substrate is more expensive, electrical and optical components may be formed therein and may allow a "stacked" arrangement, to help to conserve so-called chip "real estate" in integrated opto-electronic devices.

A substrate using indium-tin-oxide ("ITO") is also available for use in manufacturing the photonic device described above, for particular applications. Further, with e-beam lithography, other substrates could be used, as long as they have sufficient conductivity to allow the e-beam to dissipate after they penetrate and expose the membrane and spacer material, i.e., PMMA and MMA. For example, glass material with a conductive film thereon could be used as a substrate to provide mechanical support for the suspended membrane.

Also, UV or x-ray lithographic techniques could be used, with appropriate choices of resist and substrate materials. As the minimum feature size of the photolithographic tools currently used in the semiconductor industry to pattern integrated circuits shrinks below 200 nm, it is possible and desirable to use the same tools to create photonic crystals in photoresists. Use of standard semiconductor photolithographic techniques offers relatively inexpensive alternatives to the currently used techniques for fabricating photonic crystal structures, which are based on dry/wet etching of semiconductor layers.

The foregoing illustrates and describes various aspects of the invention. Additionally, the disclosure shows and describes only the preferred embodiments of the invention, but as aforementioned, it is to be understood that the invention is capable of use in various other combinations, modifications, and environments, and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other embodiments, and with the various modifications required by the particular applications or uses of the invention. Accordingly, the description is not intended to limit the invention to the form disclosed herein, and it is intended that the appended claims be construed to include alternative embodiments.

The invention claimed is:

1. A method of forming a continuously suspended membrane, the method comprising:
    providing a substrate;
    applying a first film on the substrate;
    applying a second film on the first film;
    exposing a pattern including a plurality of holes on the second film;
    developing the exposed pattern using a solvent,
    wherein a dissolution rate of the first film in the solvent is greater than a dissolution rate of the second film in the solvent,
    wherein a development time of the exposed pattern is selected to form a continuously suspended membrane from undissolved portions of the second film,
    wherein said developing the exposed pattern using a solvent comprises using a single non-etching step,
    said continuously suspended membrane being separated from the substrate by a void area.

2. A method of forming a planar photonic bandgap structure, the method comprising:
    providing a substrate;
    applying a first film on the substrate;
    applying a second film on the first film;
    exposing a pattern including a plurality of holes on the second film;
    developing the exposed pattern using a solvent,
    wherein a dissolution rate of the first film in the solvent is greater than a dissolution rate of the second film in the solvent,
    wherein a development time of the exposed pattern is selected to form a continuously suspended membrane from undissolved portions of the second film,
    said continuously suspended membrane being separated from the substrate by a void area; and
    applying a waveguiding layer onto a top surface of the continuously suspended membrane,
    said waveguiding layer having an index of refraction greater than an index of refraction of the continuously suspended membrane, wherein the plurality of holes are free of any of the waveguiding layer.

3. The method of claim 2, wherein said applying a first film includes applying a copolymer film.

4. The method of claim 2, wherein said applying a first film includes applying an MMA/MAA film.

5. The method of claim 2, wherein said applying a second film includes applying PMAA.

6. The method of claim 2, wherein said exposing a pattern includes exposing the pattern by a lithographic technique.

7. The method of claim 2, wherein said exposing a pattern includes exposing the pattern by e-beam lithography.

8. The method of claim 2, wherein said applying a waveguiding layer includes applying a layer of a semiconductor material.

9. The method of claim 2, wherein said applying a waveguiding layer includes applying a layer of silicon.

10. The method of claim 2, wherein said developing the exposed pattern includes removing essentially all of the first film between the substrate and the second film except around a supported peripheral area of the continuously suspended membrane.

11. The method of claim 2, further comprising defining a waveguiding function of the planar photonic bandgap structure by arranging the plurality of holes in the exposed pattern.

* * * * *